Feb. 24, 1959 — W. L. CLIFF — 2,874,506
FISH LANDING NET
Filed June 22, 1956 — 2 Sheets-Sheet 2
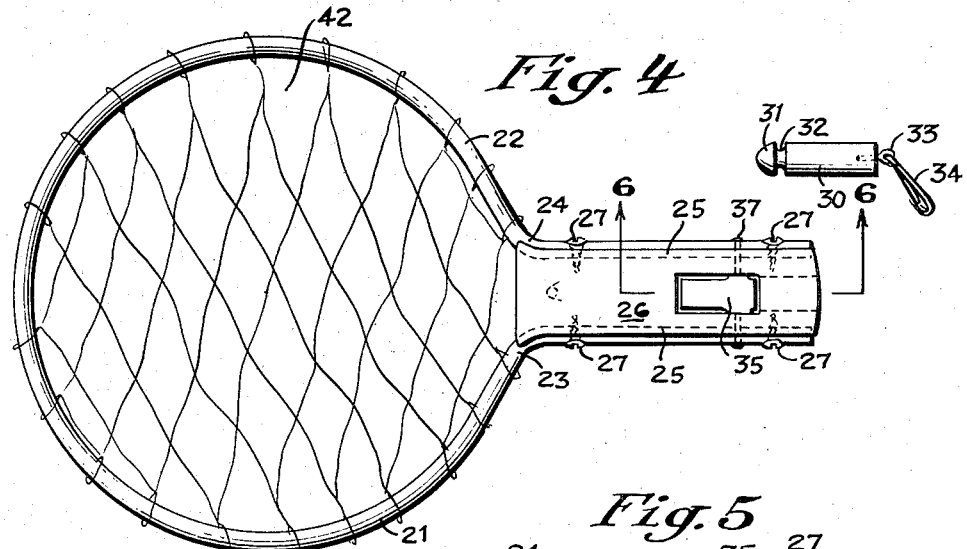
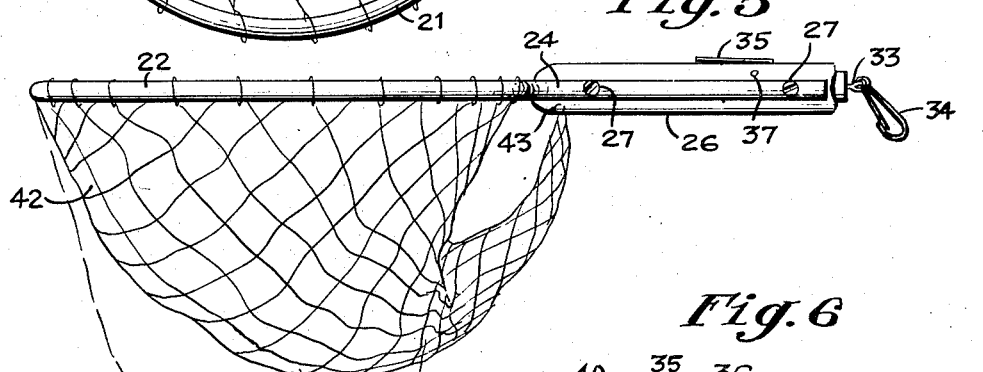
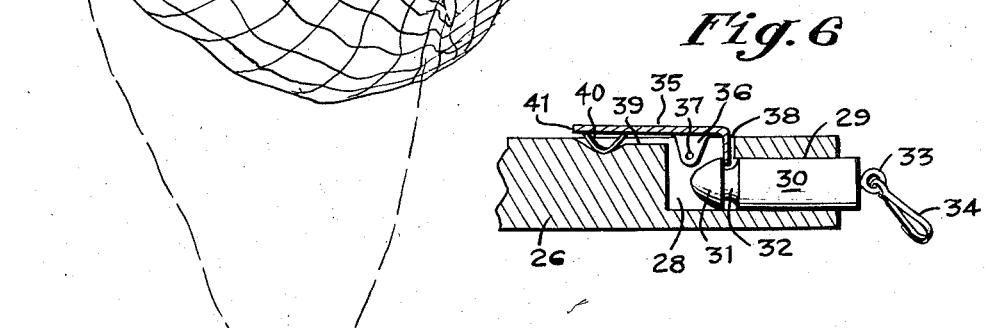
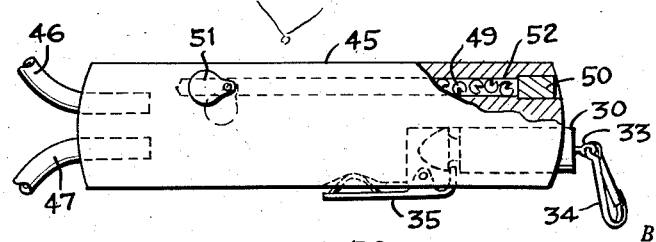
INVENTOR.
WALTER L. CLIFF
BY
Patrick D. Beavers
ATTORNEY

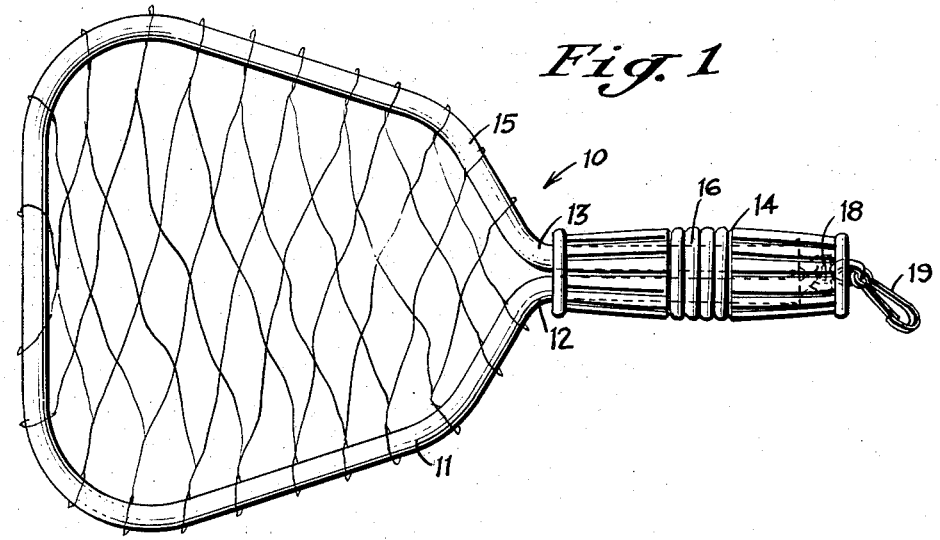
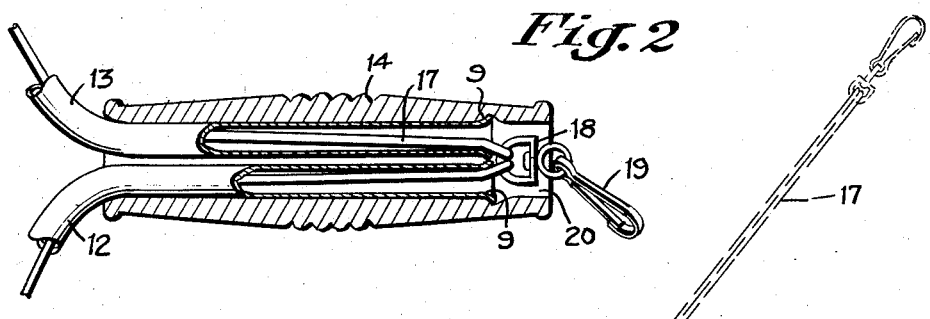
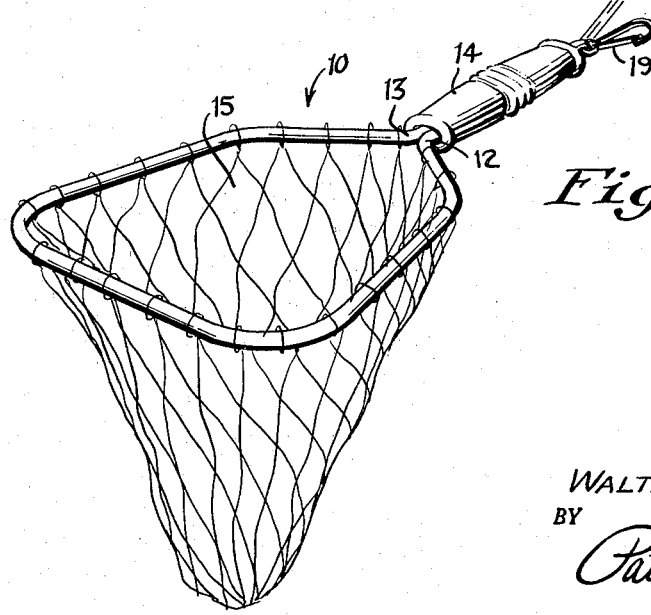

2,874,506
FISH LANDING NET

Walter L. Cliff, Kane, Pa.

Application June 22, 1956, Serial No. 593,181

1 Claim. (Cl. 43—11)

This invention relates to improvements in fish landing nets.

An object of the invention is to provide a fish landing net having resilient retractible means connected thereto so that when one end of the resilient retractible means is attached to the clothes of a fisherman or to his creel, it will return to its suspended position after it has been used.

Another object of the invention is to provide a landing net that is simple in construction and inexpensive to manufacture.

With the above and other object and advantages in view the invention consists of the novel details of construction, arrangement and combination of parts more fully hereinafter described, claimed and illustrated in the accompanying drawings in which:

Fig. 1 is a plan view of one form of a fish landing net embodying the invention;

Fig. 2 is a detailed fragmentary sectional view of the handle of the fish landing net;

Fig. 3 is a perspective view of the fish landing net showing the retractible means in extended and retracted positions.

Referring more in detail to the drawings, wherein like parts are designated by like reference numerals, the reference numeral 10 is used to generally designate one form of a fish landing net embodying the invention.

The fish landing net 10 comprises a tubular fish net supporting frame 11, having a pair of shank portions 12 and 13 that are adapted to be slidably received in a handle or hand grip 14. The frame 11 may be of any desired shape and can be formed of aluminium or any other suitable material. A woven net 15 may be secured to the frame 11 in any suitable manner.

The handle 14 may be made of rubber or any other suitable material, and a roughened area 16 may be provided on the outer surface to prevent the handle slipping when in use.

An elastic or resilient cord 17 is extended through the bore in the frame 11 and the ends thereof are connected to an eye 18 to which is connected a snap fastener 19. The free ends of the shank portions 12 and 13 are flared as at 9 to prevent wear on the cord 17 as it is extended and retracted with relation to the handle 14. A socket 20 is provided in the outer end of the handle 14 so that the eye 18 will be seated in the socket 20 and only the snap fastener 19 will extend outwardly of the end of the handle 14.

There has thus been provided a fishing net having a retracting connecting means, Figs. 1 to 3 inclusive.

It is believed that the construction and manner of use of the invention will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A fish landing net including a frame comprising a single continuous unobstructed tube bent upon itself in a broad loop portion and having the end portions thereof lying parallel, coextensive, and closely adjacent one another to provide a handle portion substantially closing the loop portion, a woven net member bridging the loop portion, a grip member having a bore passing therethrough with an annular notch portion interrupting the wall of said bore, said parallel end portions being confined in said bore, and having flared ends retained in said annular notch portion, a continuous elastic cord passing under tension entirely through said tube and having loop ends extending outwardly beyond said flared ends, a connector member secured to said loop ends and receivable in said bore in abutting relation with said flared ends to normally retain said elastic cord wholly within said tube and handle portion, and a snap fastener carried on said connector member adapted for attachment to the person, whereby movement of said net in a direction away from the person during use will effect extension of said cord exteriorly of said handle portion under tension to thereby urge automatic retraction of the net to a non-use position near the body of the person after use.

References Cited in the file of this patent

UNITED STATES PATENTS

| | | |
|---|---|---|
| 959,555 | Koberstein | May 31, 1910 |
| 2,356,209 | Brilhart | Aug. 22, 1944 |
| 2,445,765 | Harvey | Dec. 7, 1948 |
| 2,486,163 | Jennings et al. | Oct. 25, 1949 |
| 2,688,815 | Phillips | Sept. 14, 1954 |
| 2,724,920 | Boehm | Nov. 29, 1955 |